United States Patent
Burden, Jr.

(10) Patent No.: US 11,794,829 B1
(45) Date of Patent: Oct. 24, 2023

(54) GUARDED TRACK LOCK FOR POWER-OPERATED MACHINERY AND ASSOCIATED METHODS

(71) Applicant: Jerry Burden, Jr., St. Augustine, FL (US)

(72) Inventor: Jerry Burden, Jr., St. Augustine, FL (US)

( * ) Notice: Subject to any disclaimer, the term of this patent is extended or adjusted under 35 U.S.C. 154(b) by 878 days.

(21) Appl. No.: 16/834,648

(22) Filed: Mar. 30, 2020

Related U.S. Application Data

(60) Provisional application No. 62/825,602, filed on Mar. 28, 2019.

(51) Int. Cl.
*B62D 55/12* (2006.01)
*B62D 55/084* (2006.01)
*B60R 25/09* (2013.01)

(52) U.S. Cl.
CPC .............. *B62D 55/12* (2013.01); *B60R 25/09* (2013.01); *B62D 55/0845* (2013.01)

(58) Field of Classification Search
CPC ....... B60R 25/09; B60R 25/093; B62K 25/02; B62H 5/14; B62H 5/142; B62D 55/12; B62D 55/0845; Y10T 70/40; Y10T 70/493; Y10T 70/496; Y10T 70/498; Y10T 70/443; Y10T 70/573; Y10T 70/5735; Y10T 70/5739; Y10T 70/5836; Y10T 70/5841; Y10T 70/5845
USPC ..... 70/14, 34, 201, 202, 203, 259, 225–227, 70/232, 52–54
See application file for complete search history.

(56) References Cited

U.S. PATENT DOCUMENTS

| | | | | |
|---|---|---|---|---|
| 544,132 A | * | 8/1895 | Shoots .................. | B62H 5/142 70/332 |
| 554,222 A | * | 2/1896 | Hillhouse ................ | B62H 5/12 188/31 |
| 595,622 A | * | 12/1897 | Gobron .................... | B62H 5/10 224/935 |
| 1,307,161 A | * | 6/1919 | Stubblefield ............ | B60R 25/09 70/226 |
| 1,718,408 A | * | 6/1929 | Brawner ................. | F16B 39/04 411/209 |

(Continued)

FOREIGN PATENT DOCUMENTS

| | | | | | |
|---|---|---|---|---|---|
| GB | 2276133 A | * | 9/1994 | ........... | B60R 25/093 |
| GB | 2589866 A | * | 6/2021 | ............. | B60R 25/09 |

*Primary Examiner* — Suzanne L Barrett
(74) *Attorney, Agent, or Firm* — Ashkan Najafi

(57) ABSTRACT

A guarded track lock includes a support plate having a planar anterior face, a finger protruding outwardly away from the planar anterior face, and a bolt protruding outwardly away from the planar anterior face and registered parallel to the finger. A face plate has a plurality of statically coupled portions angularly offset from a central axis of the bolt, wherein one of the portions has an aperture configured to receive the bolt therethrough. A protective cover is removably engaged with the face plate and supported against the one portion, a nut affixed to the bolt and seated within the protective cover, and a locking member releasably connected to the bolt and seated within the protective cover. The bolt is configured to fit through the sprocket of the existing power-operated machinery, thereby providing the new and useful result of prohibiting operation of the track in forwarded and reward directions.

18 Claims, 23 Drawing Sheets

(56) References Cited

U.S. PATENT DOCUMENTS

| | | | | |
|---|---|---|---|---|
| 1,799,950 A * | 4/1931 | Boyd | ............... | B26B 13/28 |
| | | | | 403/163 |
| 3,056,633 A * | 10/1962 | Lucas | ............... | B62D 55/22 |
| | | | | 305/167 |
| 3,665,739 A * | 5/1972 | Boll | ............... | E05B 73/00 |
| | | | | 70/237 |
| 3,760,620 A * | 9/1973 | Robles | ............... | E05B 71/00 |
| | | | | 292/148 |
| 4,030,324 A * | 6/1977 | Rizio | ............... | E05B 73/0076 |
| | | | | 70/230 |
| 4,094,173 A * | 6/1978 | Brown | ............... | B60R 25/06 |
| | | | | 70/237 |
| 4,171,823 A * | 10/1979 | Nemes | ............... | B62H 5/14 |
| | | | | 70/227 |
| 4,294,090 A * | 10/1981 | Metzger | ............... | B62H 5/18 |
| | | | | 70/53 |
| 4,308,733 A * | 1/1982 | Tampa | ............... | B62D 43/00 |
| | | | | 411/209 |
| 4,409,804 A * | 10/1983 | Sork | ............... | B62H 5/12 |
| | | | | 70/226 |
| 5,069,049 A * | 12/1991 | Shieh | ............... | B62H 5/142 |
| | | | | 70/227 |
| 5,214,944 A * | 6/1993 | Wolthoff | ............... | B60R 25/093 |
| | | | | 403/219 |
| 5,301,527 A * | 4/1994 | Pollard | ............... | B60R 25/093 |
| | | | | 70/237 |
| 5,469,726 A * | 11/1995 | Rushing | ............... | E05B 73/0076 |
| | | | | 411/429 |
| 5,730,008 A * | 3/1998 | Case | ............... | E05B 67/063 |
| | | | | 70/237 |
| 5,730,012 A * | 3/1998 | Link | ............... | B62H 5/12 |
| | | | | 28/259 |
| 5,956,983 A * | 9/1999 | Hughes | ............... | B62H 5/14 |
| | | | | 70/227 |
| 5,960,653 A * | 10/1999 | DeWalch | ............... | E05B 65/006 |
| | | | | 70/164 |
| 6,112,560 A * | 9/2000 | Mabee | ............... | E05B 73/00 |
| | | | | 70/237 |
| 6,116,700 A * | 9/2000 | Herrera | ............... | B60B 3/147 |
| | | | | 70/225 |
| 6,427,498 B1 * | 8/2002 | Cobb | ............... | B60R 25/09 |
| | | | | 70/56 |
| 6,484,544 B1 * | 11/2002 | Wing | ............... | B62H 5/145 |
| | | | | 211/5 |
| 6,749,094 B1 * | 6/2004 | Dexel | ............... | B62D 43/007 |
| | | | | 224/42.25 |
| 6,796,154 B2 * | 9/2004 | Gebow | ............... | B60R 25/09 |
| | | | | 70/237 |
| 6,941,780 B1 * | 9/2005 | Marr | ............... | B60R 25/09 |
| | | | | 70/226 |
| 7,467,530 B2 * | 12/2008 | Torrado | ............... | E05B 67/36 |
| | | | | 70/237 |
| 8,052,225 B2 * | 11/2011 | Inoue | ............... | B62K 25/02 |
| | | | | 301/124.2 |
| 8,087,268 B1 * | 1/2012 | Pruitt | ............... | E05B 67/383 |
| | | | | 70/164 |
| 2008/0041127 A1 * | 2/2008 | Xavier | ............... | B62H 5/18 |
| | | | | 70/228 |
| 2012/0260702 A1 * | 10/2012 | Jones | ............... | B60B 7/16 |
| | | | | 70/237 |

* cited by examiner

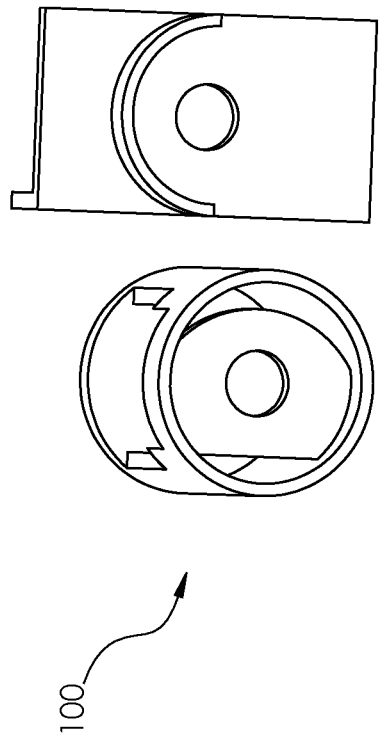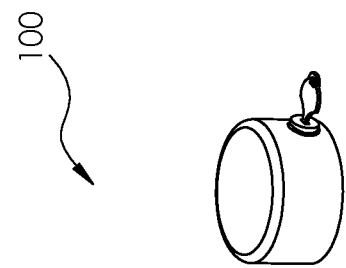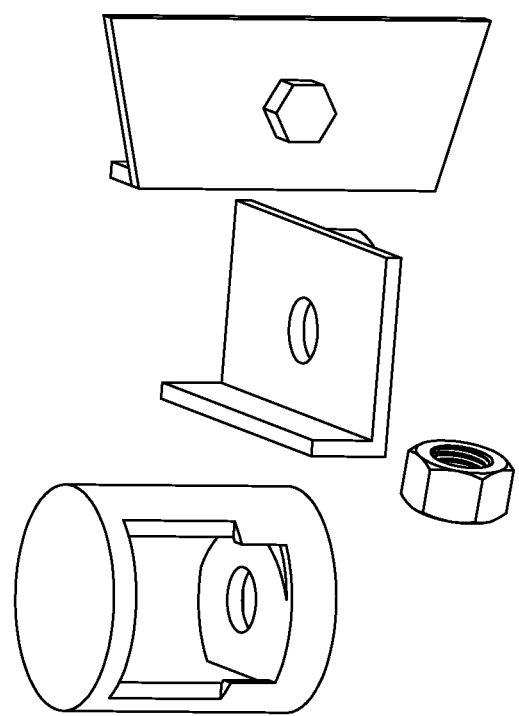
FIG. 3
FIG. 4

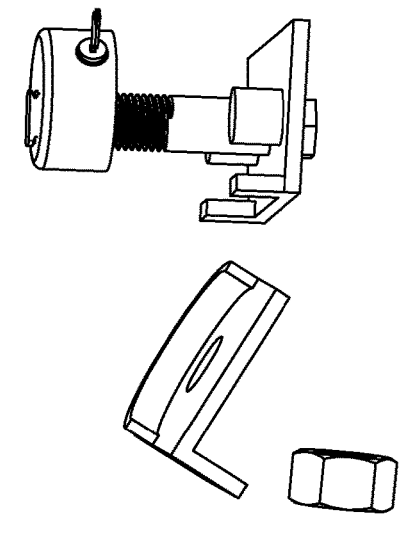
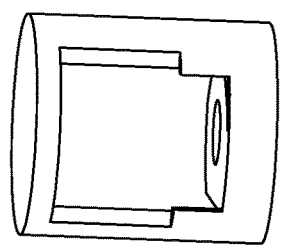
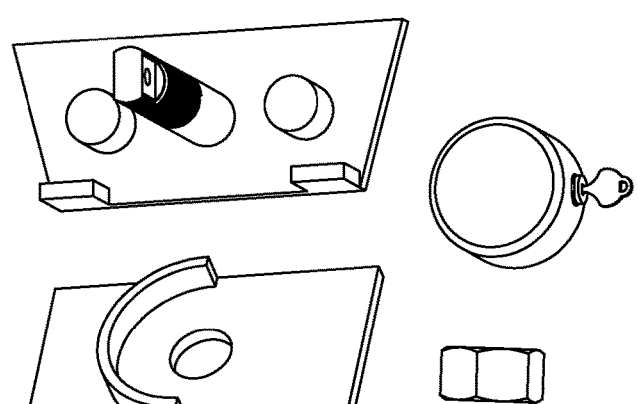
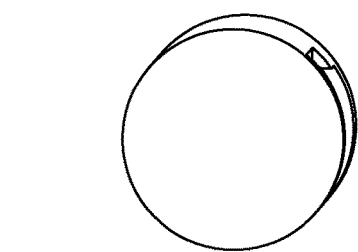
FIG. 5
FIG. 6

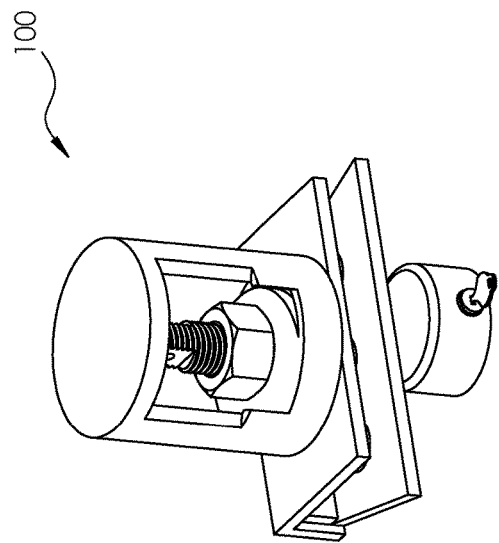
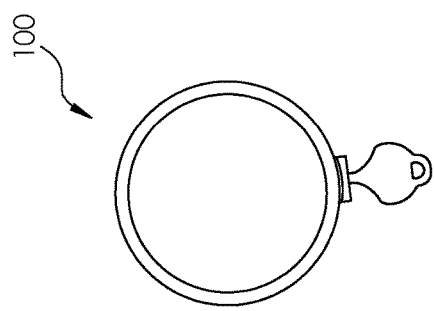
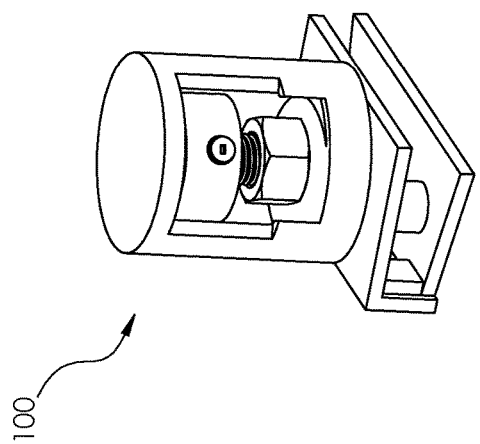

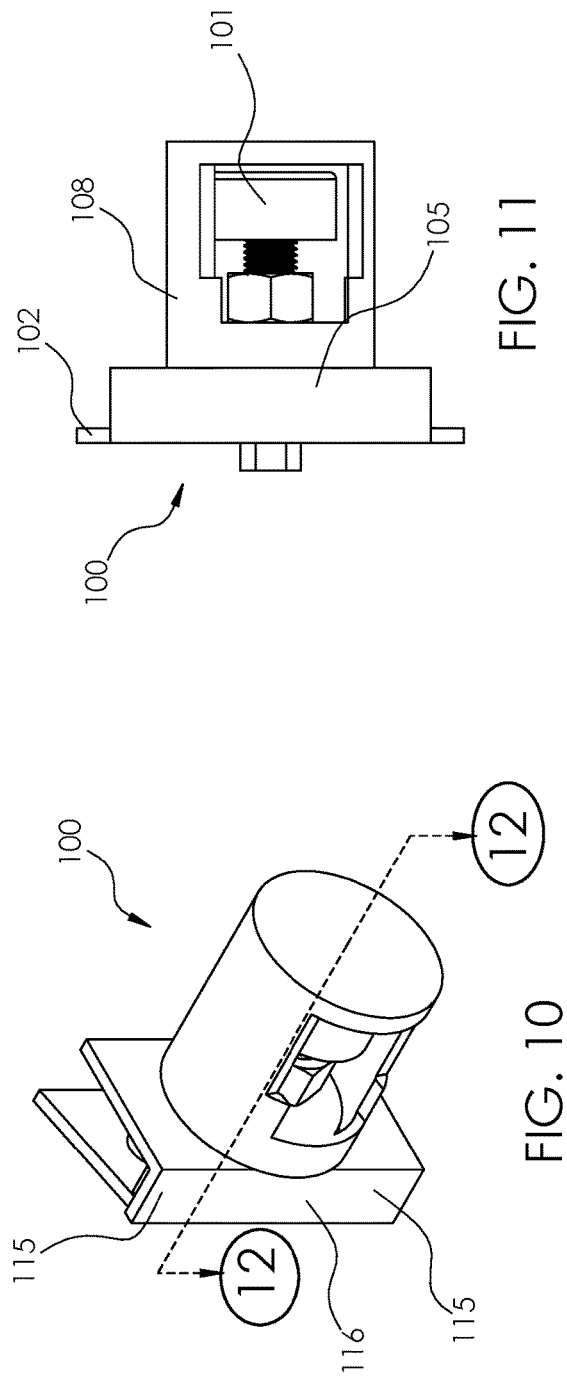

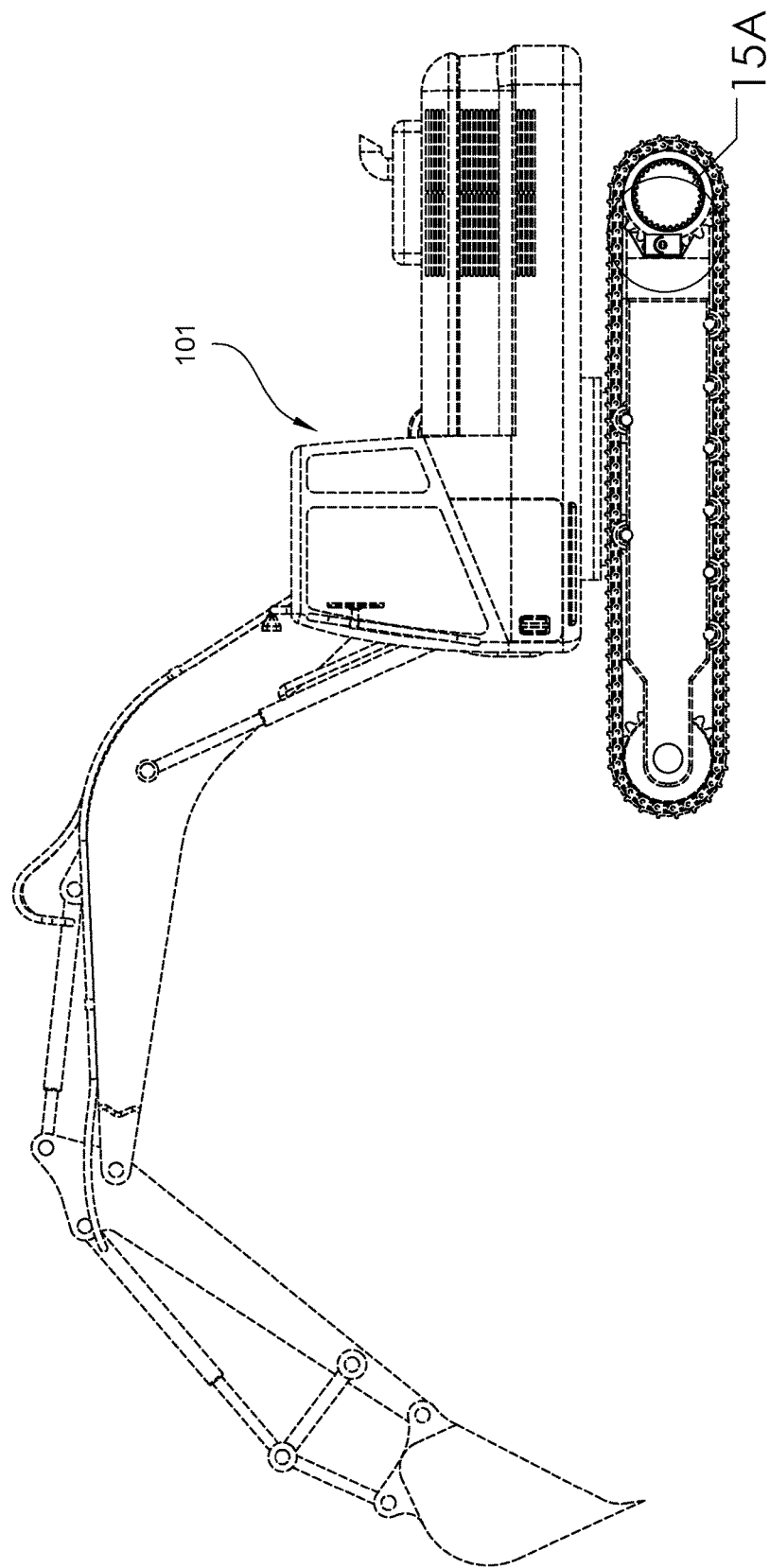
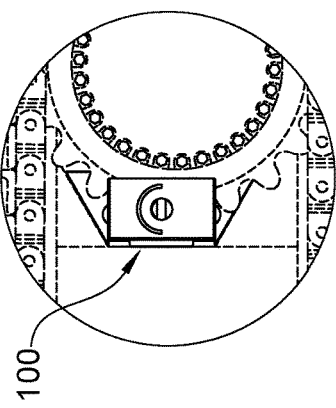
FIG. 15
FIG. 15A

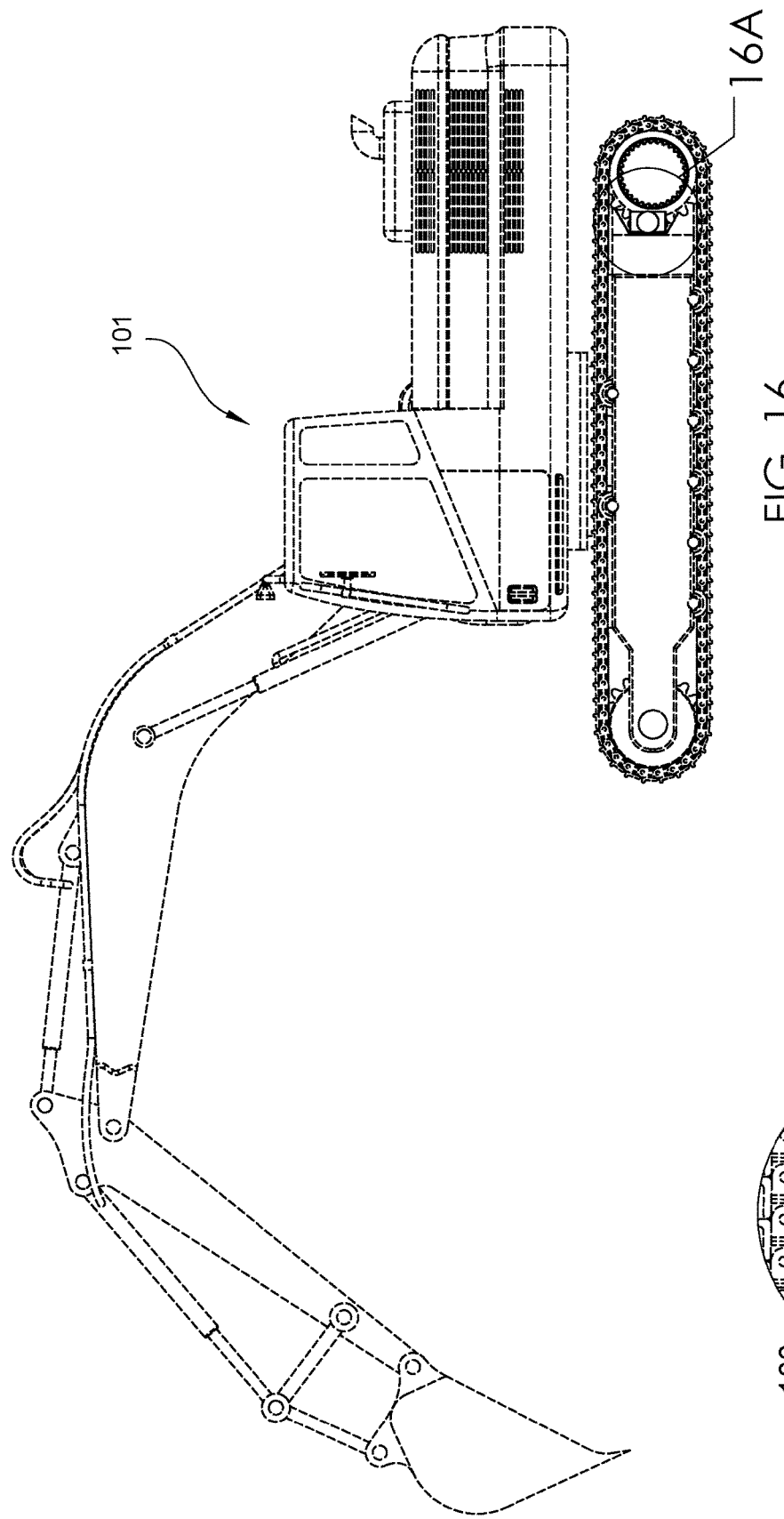
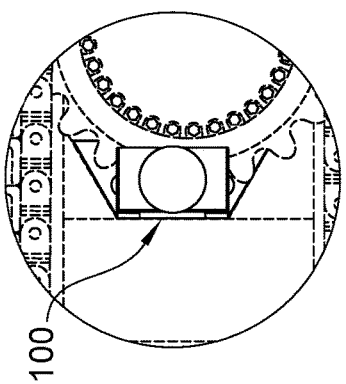

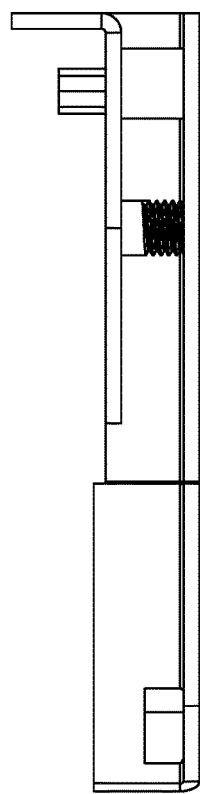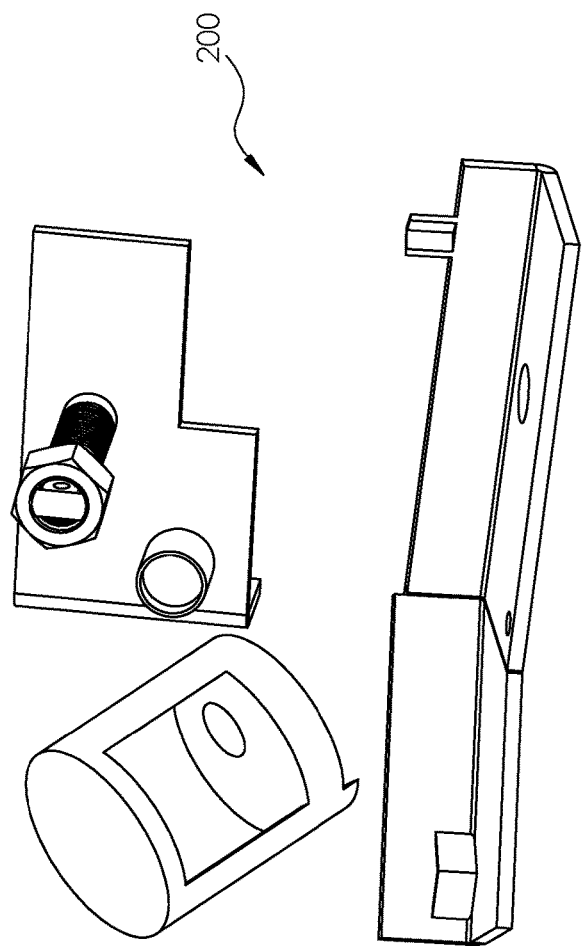
FIG. 21
FIG. 22

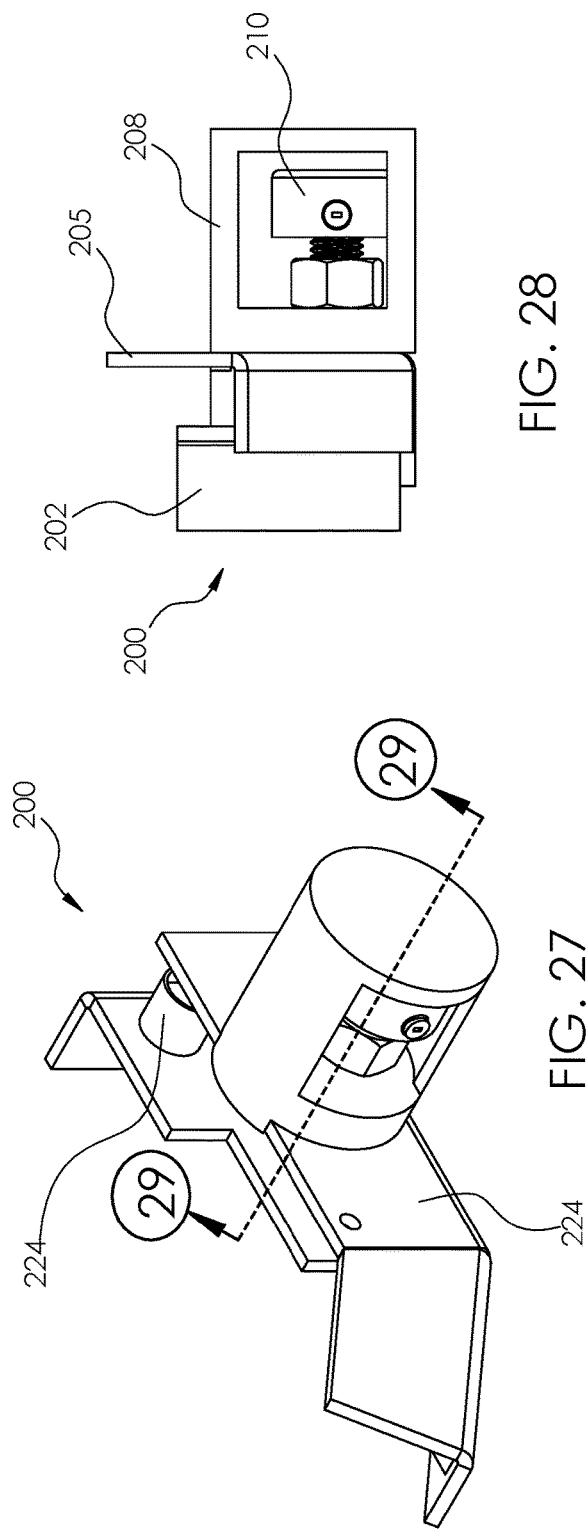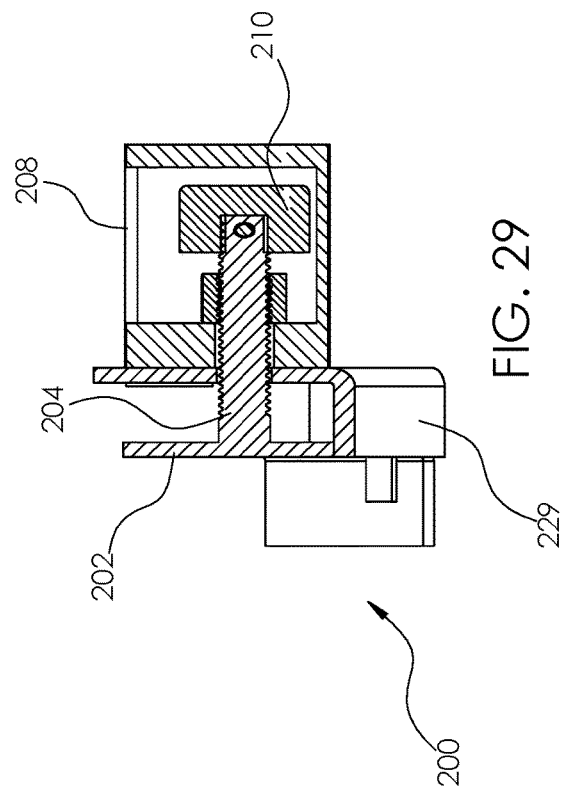

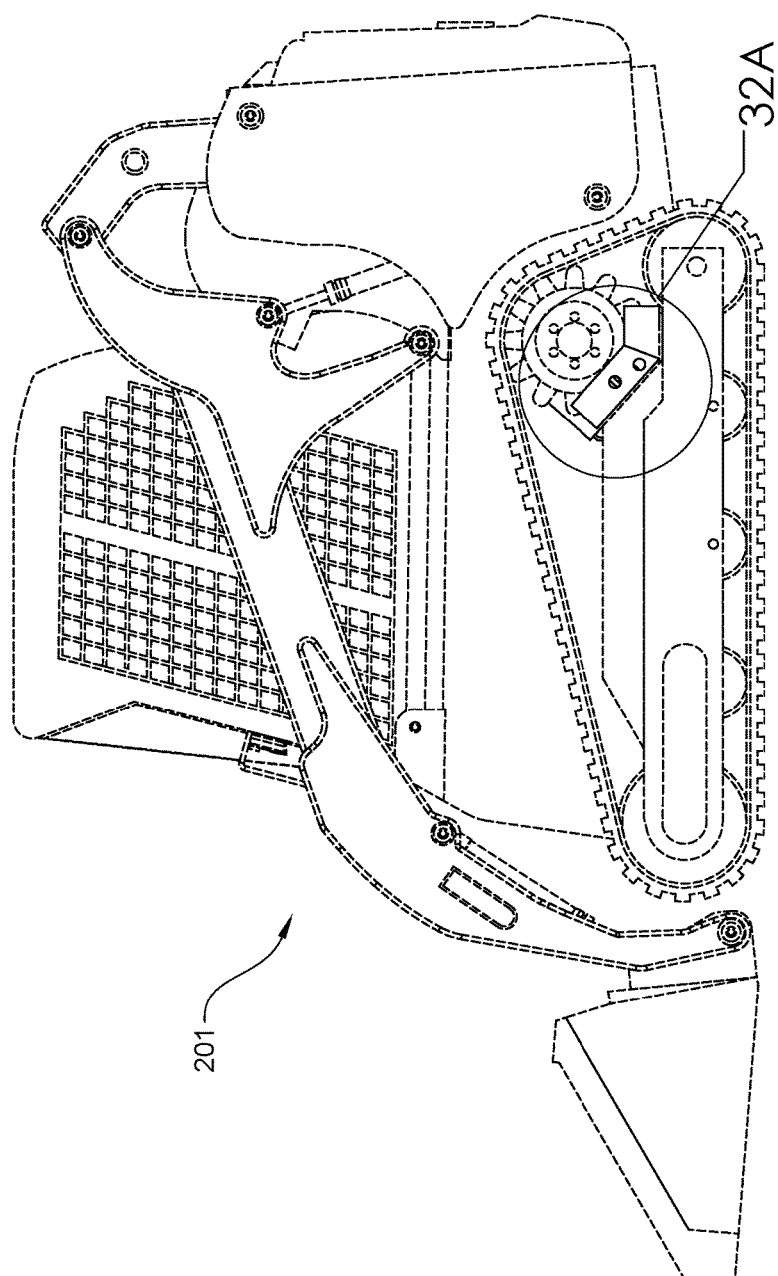
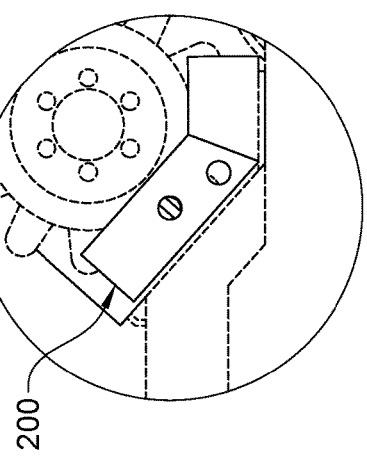
FIG. 32
FIG. 32A

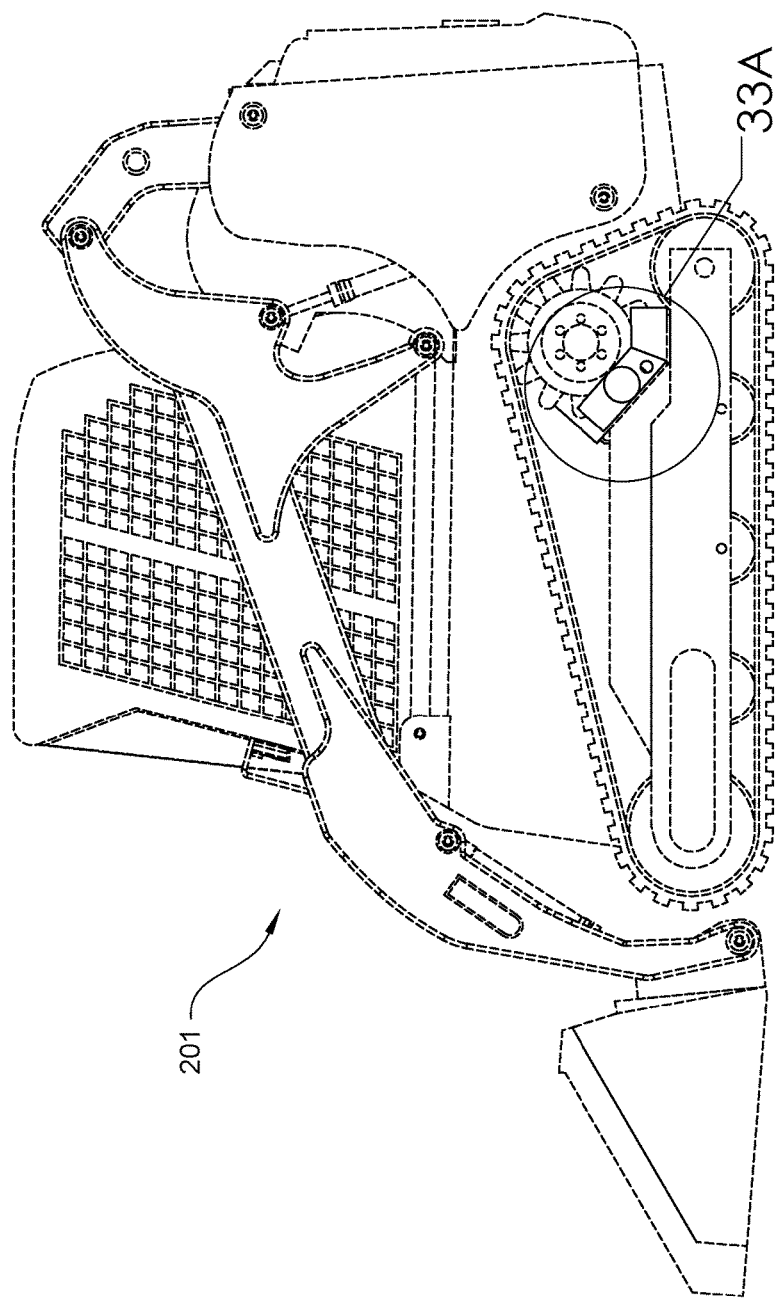
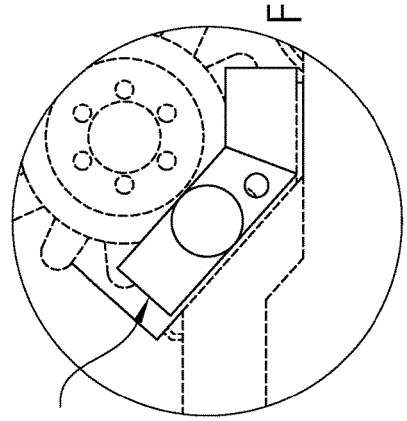

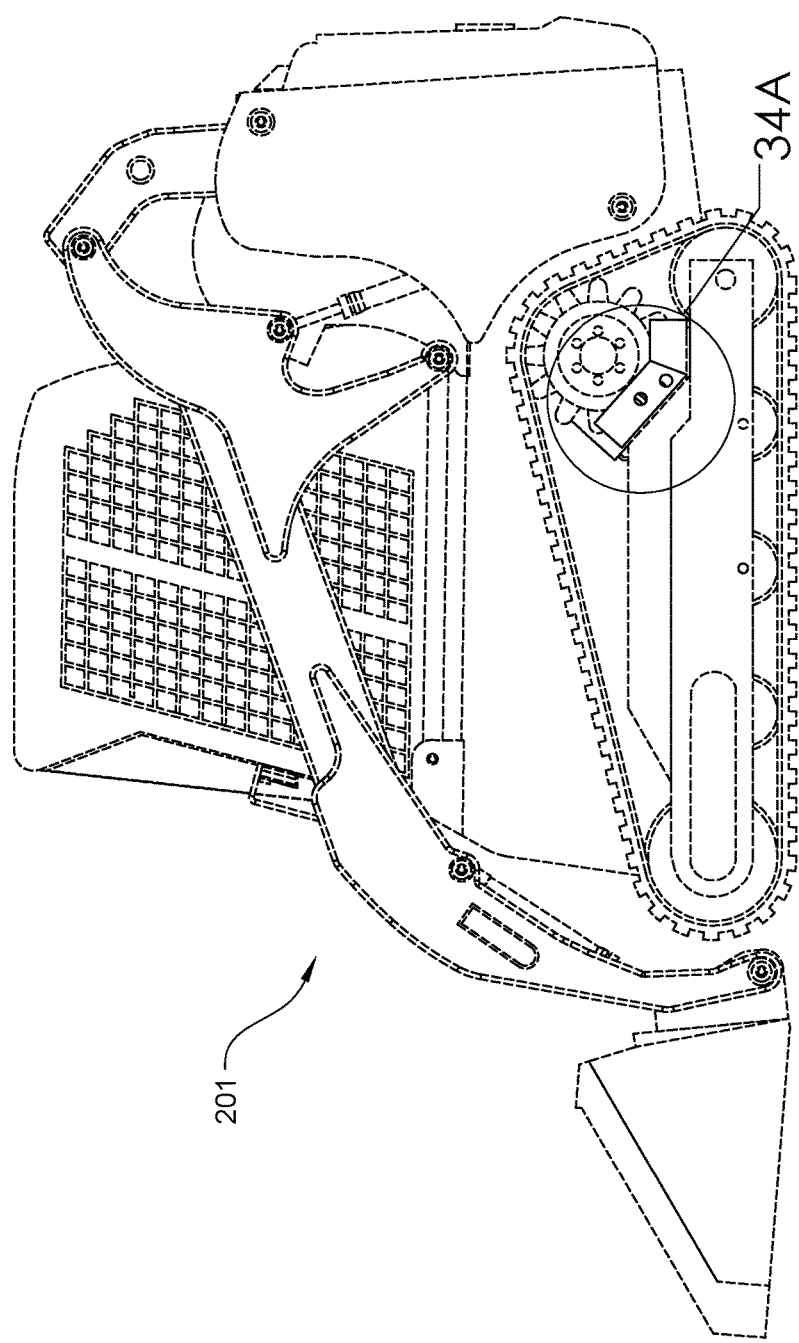
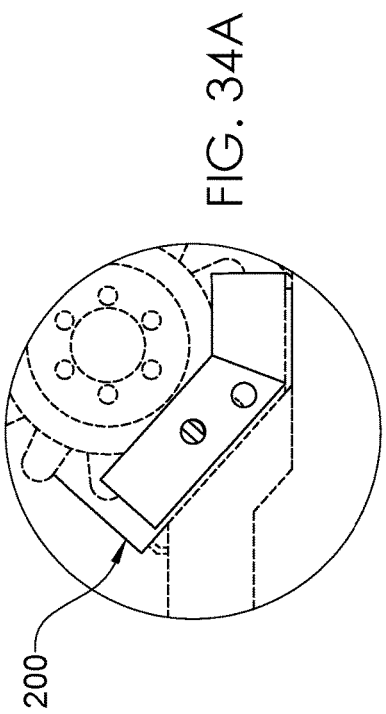

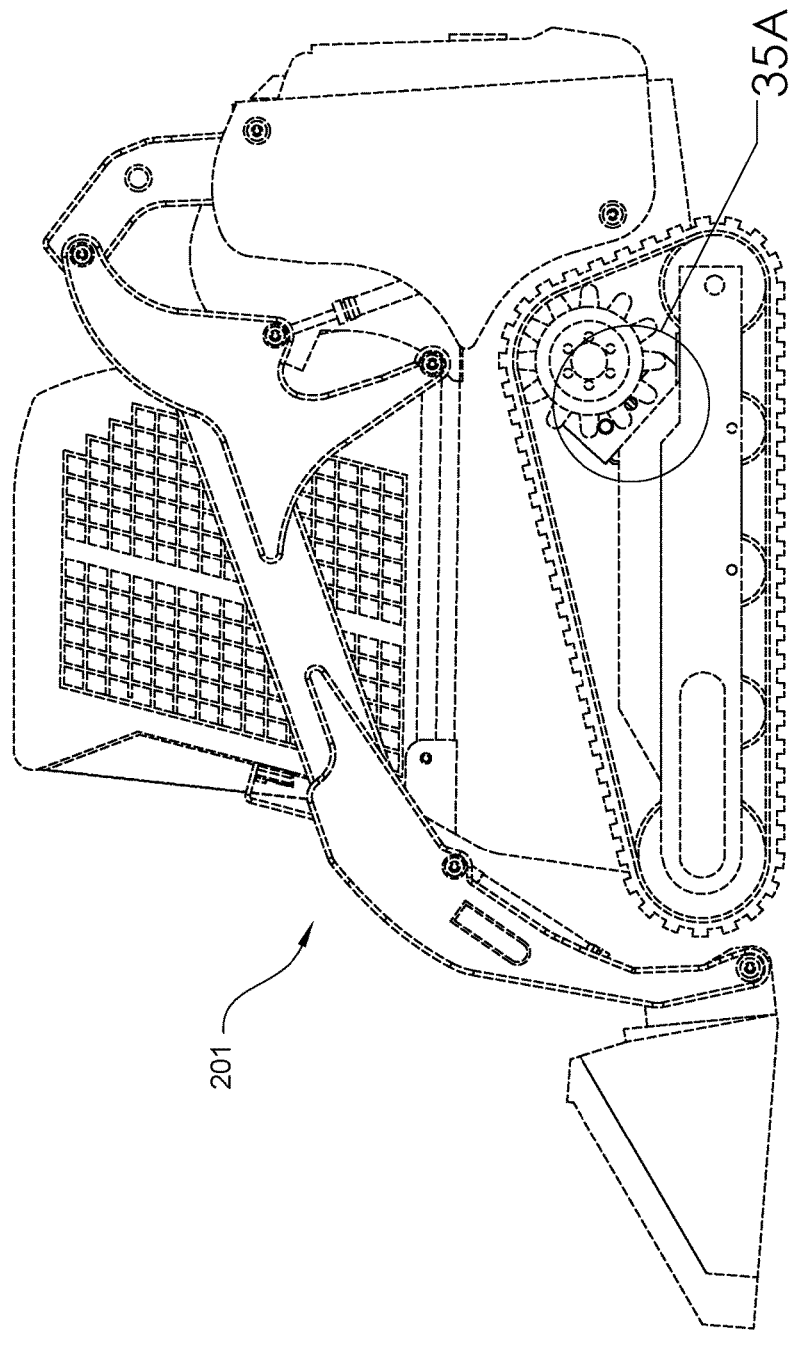
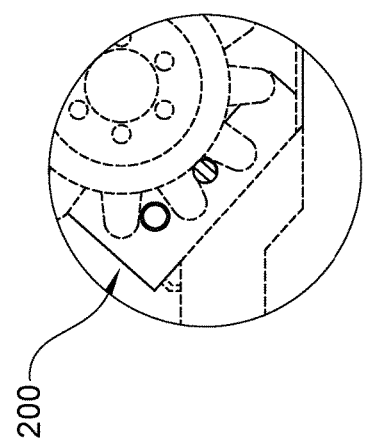
FIG. 35
FIG. 35A

GUARDED TRACK LOCK FOR POWER-OPERATED MACHINERY AND ASSOCIATED METHODS

CROSS REFERENCE TO RELATED APPLICATIONS

This is a non-provisional patent application that claims the benefit of U.S. provisional patent application No. 62/825,602 filed Mar. 28, 2019, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to track locks and, more particularly, to specially designed guarded track locks for preventing unauthorized operation of power-operated machinery having rotating tracks.

Prior Art

Theft of vehicles is an ongoing problem. This is particularly true of small, easily transported vehicles such as excavators, track loaders, and the like. Such vehicles tend to be relatively large, such that one or two people can easily roll even a locked vehicle into a truck or trailer. As a result, many thefts of vehicles such as excavators, track loaders, and the like are crimes of opportunity, and could be avoided if the vehicle were not so easily moved.

At the same time, any locking mechanism which would immobilize the vehicle must also be easily locked onto and unlocked from the vehicle. In addition, it should preferably be light and small enough that it can be carried with the vehicle for use in remote locations. This combination of factors has proven elusive, and thus there has been a long felt need for a vehicular locking mechanism meeting these criteria.

Since it is common to leave excavators, track loaders, and the like unattended, at a job site, there is very often ample opportunity for an unauthorized person to gain access to a vehicle in order to steal it. Although excavators, track loaders, and the like are large and heavy enough to make it difficult to carry them away, it is relatively easy to access the electrical system and start the engine, even without the key to the ignition.

Accordingly, a need remains for specially designed guarded track locks in order to overcome at least one of the above-noted shortcomings. The exemplary embodiment(s) satisfy such a need by guarded track locks that is convenient and easy to use, lightweight yet durable in design, versatile in its applications, and designed for preventing unauthorized operation of power-operated machinery having rotating tracks.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a guarded track lock for preventing unauthorized operation of a power-operated machinery (e.g., excavator) having a track rotated by a sprocket. These and other objects, features, and advantages of the non-limiting exemplary embodiment(s) are provided by a guarded track lock including a support plate including a planar anterior face, a plurality of fingers protruding outwardly away from the planar anterior face, a plurality of support arms protruding outwardly away from the planar anterior face and registered parallel to the fingers, respectively, and a bolt protruding outwardly away from the planar anterior face and registered parallel to the fingers and the support arms. The guarded track lock further includes a face plate has an aperture and an arcuate rim juxtaposed to the aperture, a protective cover removably engaged with the face plate and supported against the arcuate rim, a nut threadably affixed to the bolt and seated within the protective cover; and a key-actuated locking member releasably connected to the bolt and seated within the protective cover. Advantageously, the bolt is configured to fit through the sprocket of the existing power-operated machinery and prohibit operation of the track in forwarded and reward directions.

In a non-limiting exemplary embodiment, the support plate has a trapezoid shape, and the face plate is intercalated between the support plate and the protective cover.

In a non-limiting exemplary embodiment, the plurality of fingers each have a longitudinal length registered orthogonal to the planar anterior face.

In a non-limiting exemplary embodiment, the plurality of support arms are statically coupled to a longitudinal peripheral edge of the support plate.

In a non-limiting exemplary embodiment, the bolt includes a threaded distal end having a flattened tip provided with a hole therethrough.

In a non-limiting exemplary embodiment, the face plate is substantially L-shaped and has a planar wall oriented parallel to the support arms.

In a non-limiting exemplary embodiment, the protective cover has a generally cylindrical shape and includes an access opening configured to receive the nut and the locking member. Advantageously, the bolt is removably inserted through the aperture along a linear travel path such that the flattened tip terminates within the protective cover.

In a non-limiting exemplary embodiment, the locking member includes a key-actuated locking member (puck lock) being detachable from the bolt.

In a non-limiting exemplary embodiment, the arcuate rim has a radius of curvature substantially equal to a radius of curvature of the protective cover.

The present disclosure further includes a guarded track lock for preventing unauthorized operation of a power-operated machinery (e.g., tack loader) having a track rotated by a sprocket. The guarded track lock includes a support plate including a planar anterior face, a finger protruding outwardly away from the planar anterior face, and a bolt protruding outwardly away from the planar anterior face and registered parallel to the finger. The guarded track lock further includes a face plate having a plurality of statically coupled portions angularly offset from a central axis of the bolt, wherein one of the portions has an aperture configured to receive the bolt therethrough. A protective cover is removably engaged with the face plate and supported against the one portion. A nut is threadably affixed to the bolt and seated within the protective cover, and a key-actuated locking member (puck lock) is releasably connected to the bolt and seated within the protective cover. Advantageously, the bolt is configured to fit through the sprocket of the existing power-operated machinery, thereby prohibiting operation of the track in forwarded and reward directions.

In a non-limiting exemplary embodiment, the support plate further has a planar posterior face coupled to the planar anterior face and registered orthogonal thereto.

In a non-limiting exemplary embodiment, the finger has a longitudinal length registered orthogonal to the planar anterior face.

In a non-limiting exemplary embodiment, the finger is spaced apart from the bolt and the planar posterior face.

In a non-limiting exemplary embodiment, the bolt includes a threaded distal end having a flattened tip provided with a hole therethrough.

In a non-limiting exemplary embodiment, the protective cover has a generally cylindrical shape and includes an access opening configured to receive the nut and the locking member. Advantageously, the bolt is removably inserted through one of the first aperture and the second aperture along a mutually exclusive linear travel path such that the flattened tip terminates within the protective cover.

In a non-limiting exemplary embodiment, the locking member includes a key-actuated locking member (puck lock) being detachable from the bolt.

In a non-limiting exemplary embodiment, the one portion has a planar side wall detachable abutted against the planar anterior face when the flattened tip is situated inside the protective cover. In this manner, the finger engages the one portion.

In a non-limiting exemplary embodiment, the face plate is intercalated between the support plate and the protective cover.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

FIG. 3 is another exploded view of the guarded track lock shown in FIG. 1;

FIG. 4 is yet another exploded view of the guarded track lock shown in FIG. 1;

FIG. 5 is yet another exploded view of the guarded track lock shown in FIG. 1, with a puck lock attached to the bolt;

FIG. 6 is yet another exploded view of the guarded track lock shown in FIG. 1;

FIG. 7 is another perspective view of the guarded track lock shown in FIG. 1, with the puck lock attached to the bolt and seated inside the protective cover;

FIG. 8 is another perspective view of the guarded track lock shown in FIG. 1, with the puck lock detached from the bolt and positioned outside the protective cover;

FIG. 9 is a top plan view of the key-actuated puck lock shown in FIG. 8;

FIG. 10 is yet another perspective view of the guarded track lock shown in FIG. 1, with the puck lock attached to the bolt and seated inside the protective cover;

FIG. 11 is side elevational view of the guarded track lock shown in FIG. 10;

FIG. 12 is a cross-sectional view taken along line 12-12 in FIG. 10;

FIG. 15 is an environmental view showing the guarded track lock affixed to an excavator, during installation, wherein the face plate is engaged with the bolt and the protective cover is detached from the bolt;

FIG. 15A is an enlarged view of section 15A taken in FIG. 15;

FIG. 16 is an environmental view showing the guarded track lock affixed to an excavator, during installation, wherein the face plate is engaged with the bolt and the protective cover is attached to the bolt;

FIG. 16A is an enlarged view of section 16A taken in FIG. 16;

FIG. 21 is a partially exploded view of the guarded track lock shown in FIG. 19;

FIG. 22 is an exploded view of the guarded track lock shown in FIG. 19;

FIG. 27 is yet another perspective view of the guarded track lock shown in FIG. 19;

FIG. 28 is a side elevational view of the guarded track lock shown in FIG. 19;

FIG. 29 is a cross-sectional view taken along line 29-29 in FIG. 27;

FIG. 31A is an enlarged view of section 31A taken in FIG. 31;

FIG. 32 is an environmental view showing the guarded track lock affixed to a track loader, during installation, wherein the face plate is engaged with the bolt and the protective cover is detached from the bolt;

FIG. 32A is an enlarged view of section 32A taken in FIG. 32;

FIG. 33 is an environmental view showing the guarded track lock affixed to a track loader, during installation, wherein the face plate is engaged with the bolt and the protective cover is attached to the bolt;

FIG. 33A is an enlarged view of section 33A taken in FIG. 33;

FIG. 34 is an environmental view showing the guarded track lock affixed to a track loader, during removal, wherein the face plate is engaged with the bolt and the protective cover is detached from the bolt;

FIG. 34A is an enlarged view of section 34A taken in FIG. 34;

FIG. 35 is an environmental view showing the guarded track lock affixed to a track loader, during removal, wherein the face plate and protective cover are removed from the bolt;

FIG. 35A is an enlarged view of section 35A taken in FIG. 35;

Figure 2:
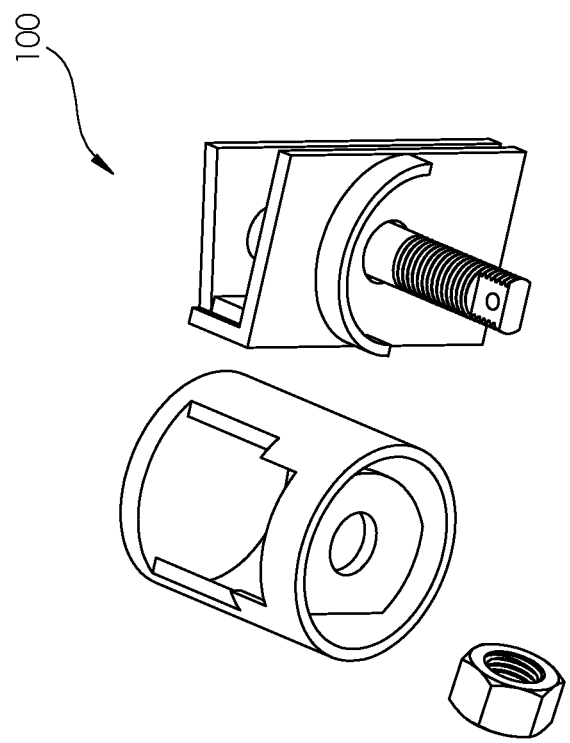
FIG. 2 is an exploded view of the guarded track lock shown in FIG. 1.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

Figure 1:
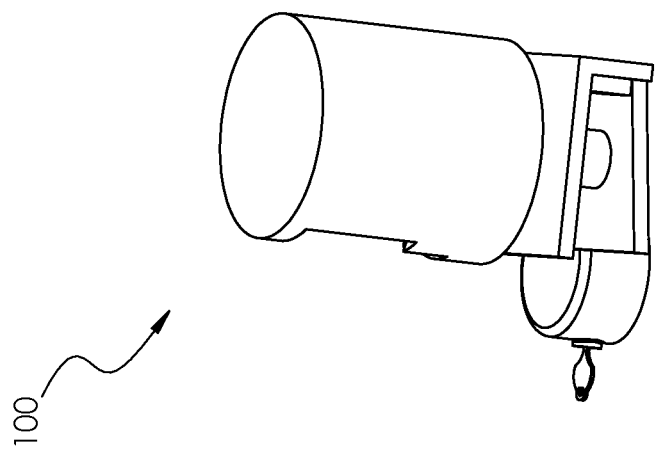
FIG. 1 is a perspective view of a guarded track lock for use with a JOHN.DEERE.® 35D excavator, in accordance with a non-limiting exemplary embodiment of the present disclosure.
Figure 13:
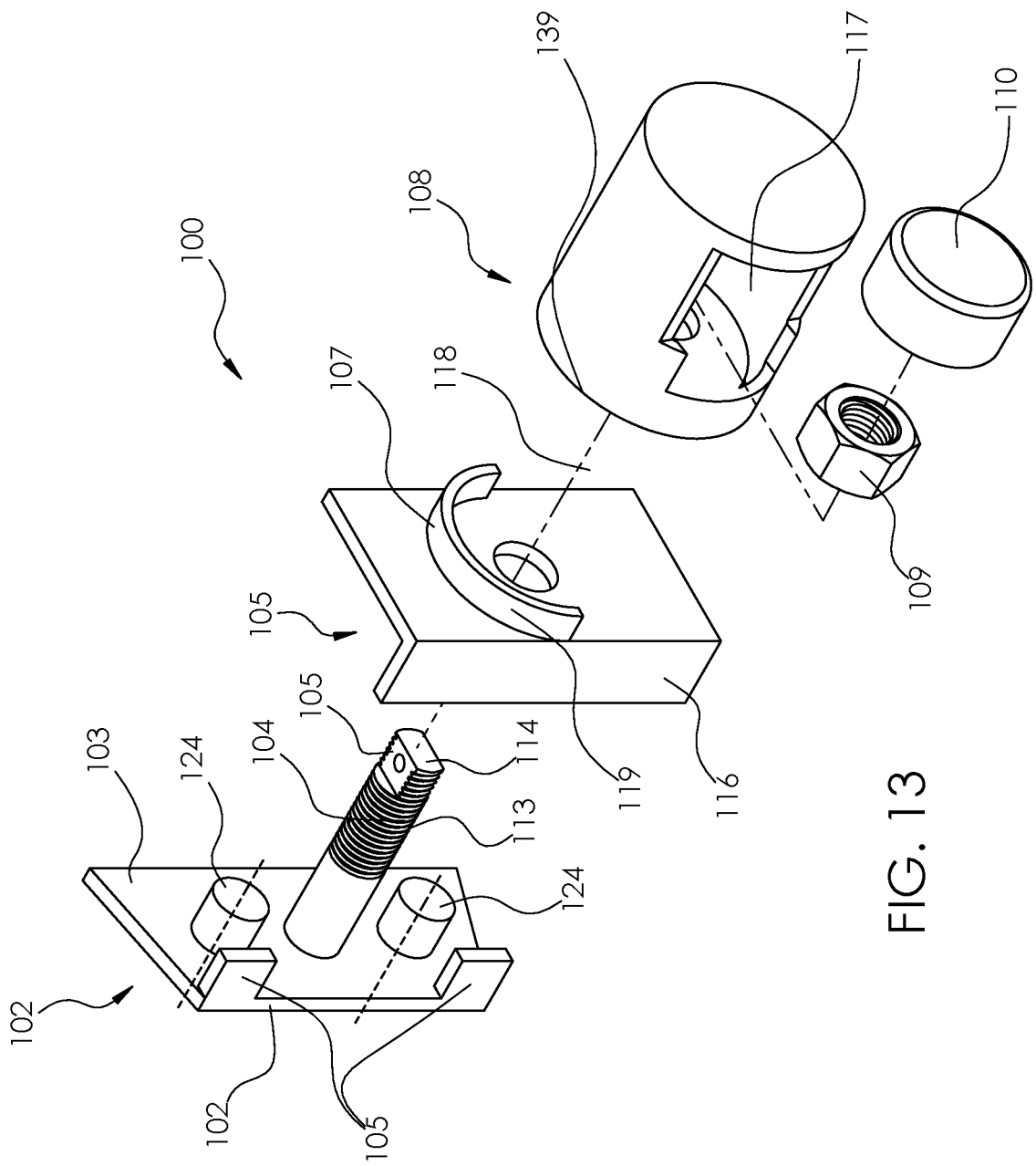
FIG. 13 is yet another exploded view of the guarded track lock shown in FIG. 1.
Figure 14:
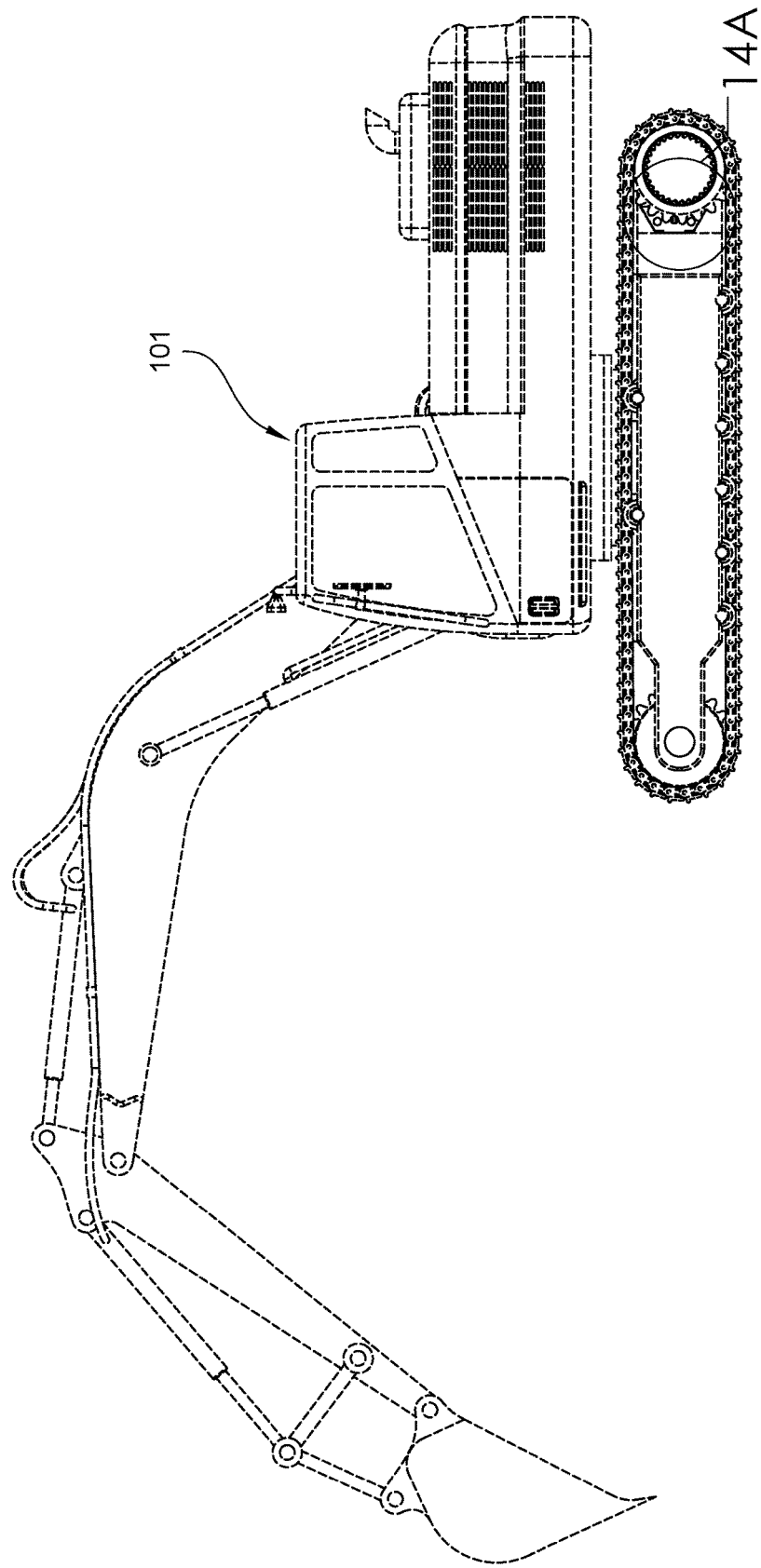
FIG. 14 is an environmental view showing the guarded track lock affixed to an excavator, during installation, wherein the face plate and protective cover are removed from the bolt.
Figure 14A:
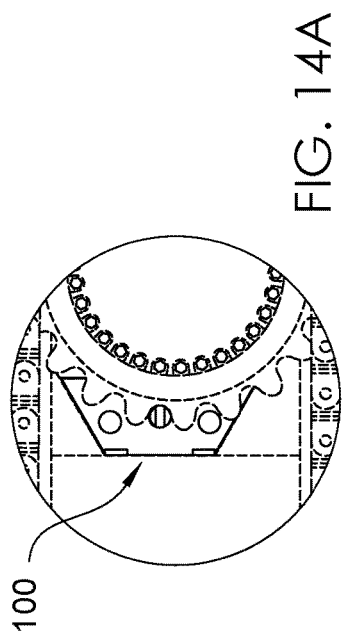
FIG. 14A is an enlarged view of section 14A taken in FIG. 14.
Figures 17, 17A:
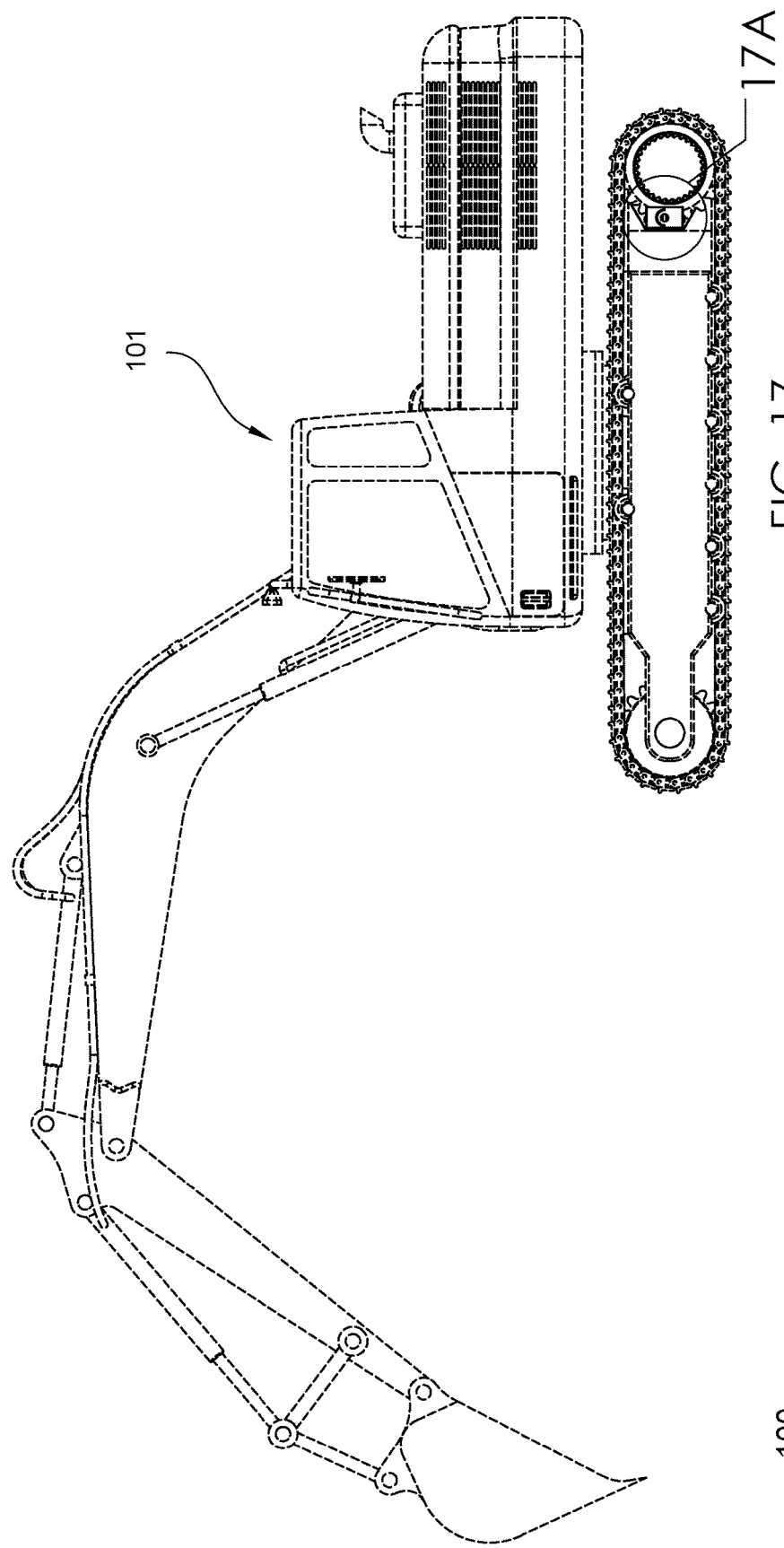
FIG. 17 is an environmental view showing the guarded track lock affixed to an excavator, during removal, wherein the face plate is engaged with the bolt and the protective cover is detached from the bolt.
FIG. 17A is an enlarged view of section 17A taken in FIG. 17.
Figure 18:
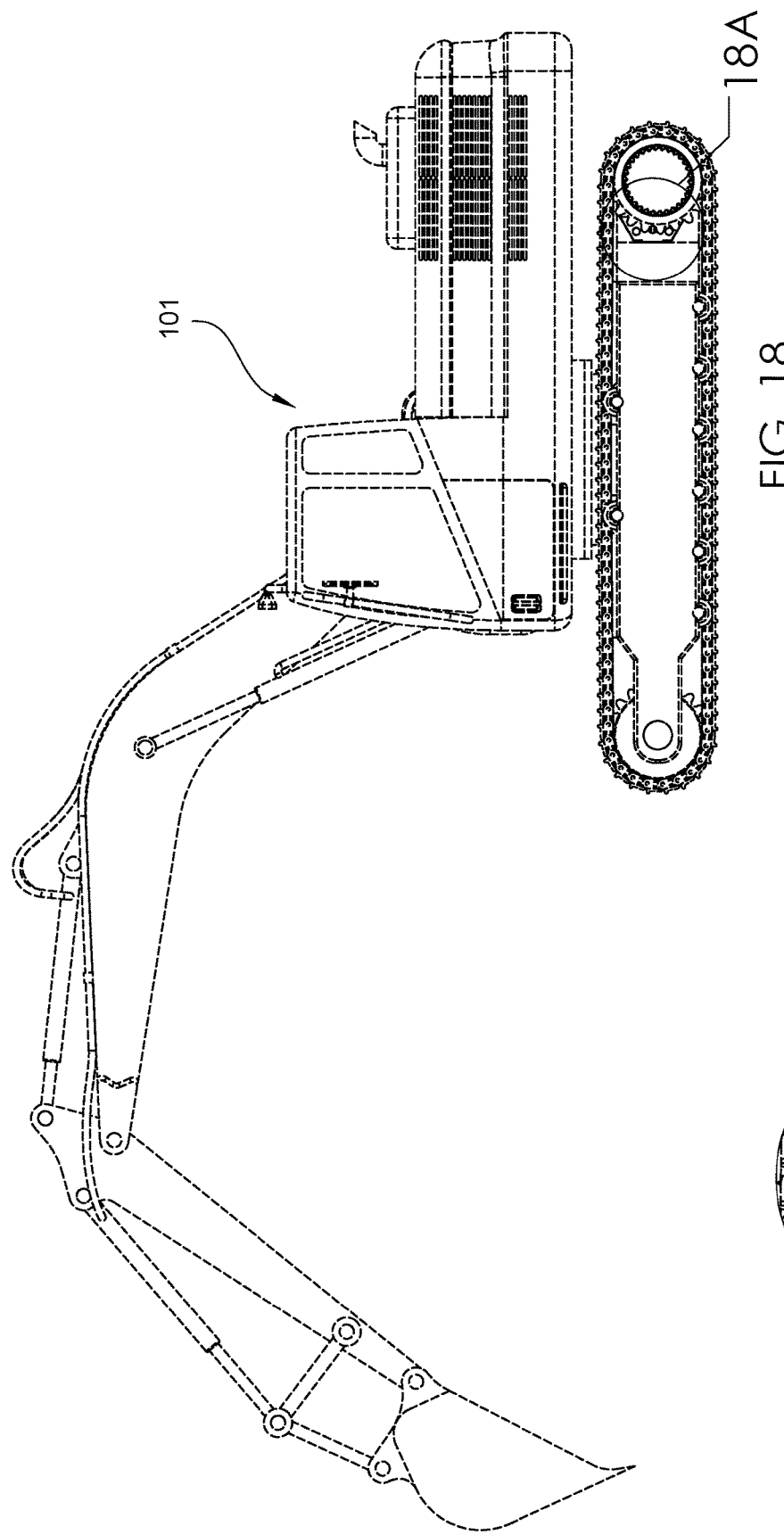
FIG. 18 is an environmental view showing the guarded track lock affixed to an excavator, during removal, wherein the face plate and protective cover are removed from the bolt.
Figure 19:
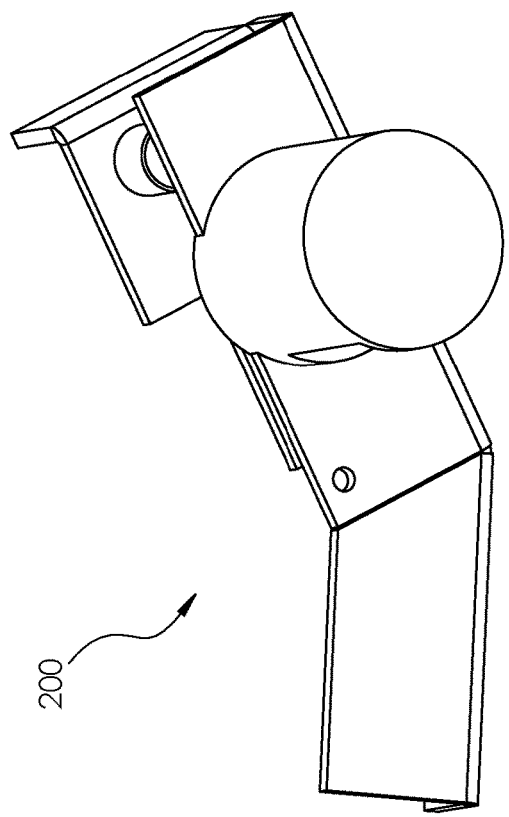
FIG. 19 is a perspective view of a guarded track lock for use with a JOHN.DEERE.® 317G track loader, in accordance with a non-limiting exemplary embodiment of the present disclosure.
Figure 20:
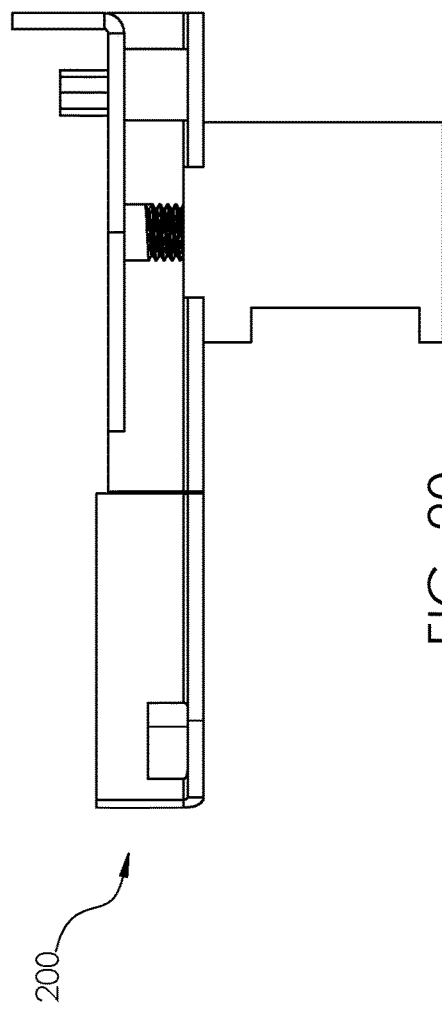
FIG. 20 is a top plan view of the guard track lock shown in FIG. 19.
Figure 23:
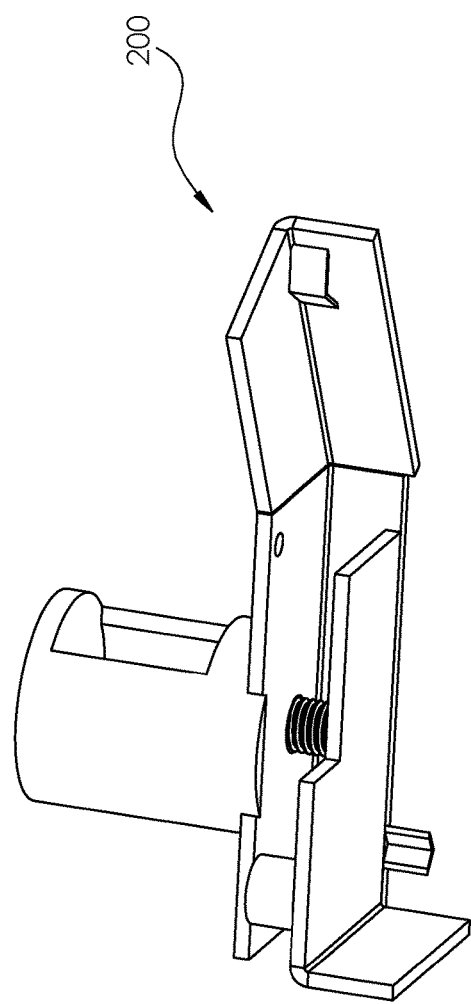
FIG. 23 is another perspective view of the guarded track lock shown in FIG. 19.
Figure 24:
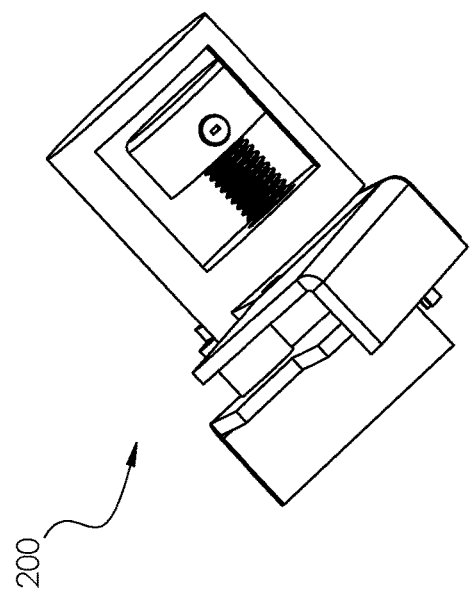
FIG. 24 is yet another perspective view of the guarded track lock shown in FIG. 19, wherein the locking member (puck lock) is attached to the bolt and seated inside the protective cover.
Figure 25:
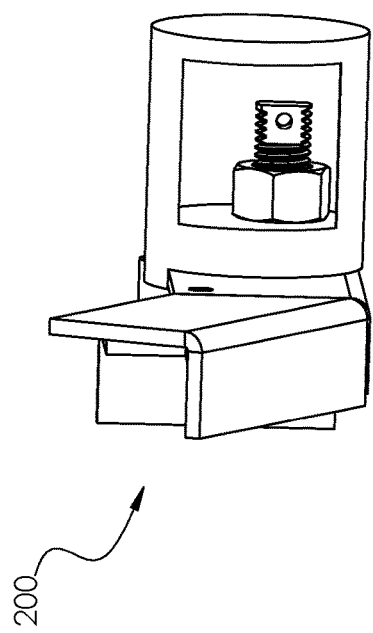
FIG. 25 is a side elevational view of the guarded track lock shown in FIG. 19.
Figure 26:
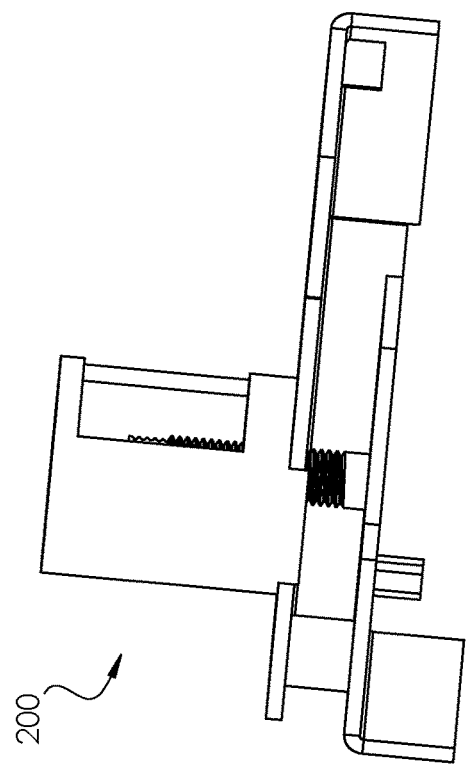
FIG. 26 is yet another perspective view of the guarded track lock shown in FIG. 19.
Figure 30:
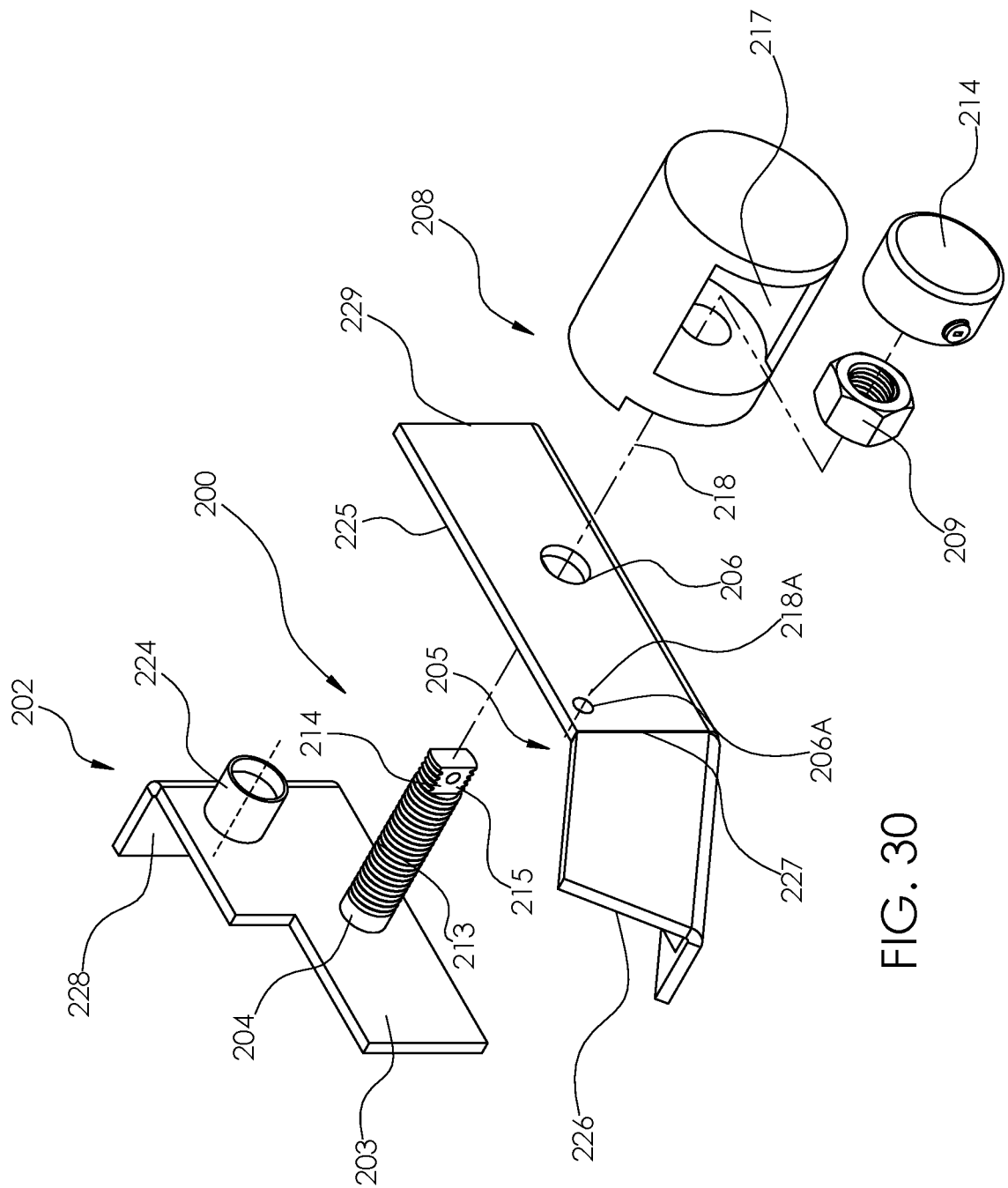
FIG. 30 is an exploded view of the guarded track lock shown in FIG. 19.
Figure 31:
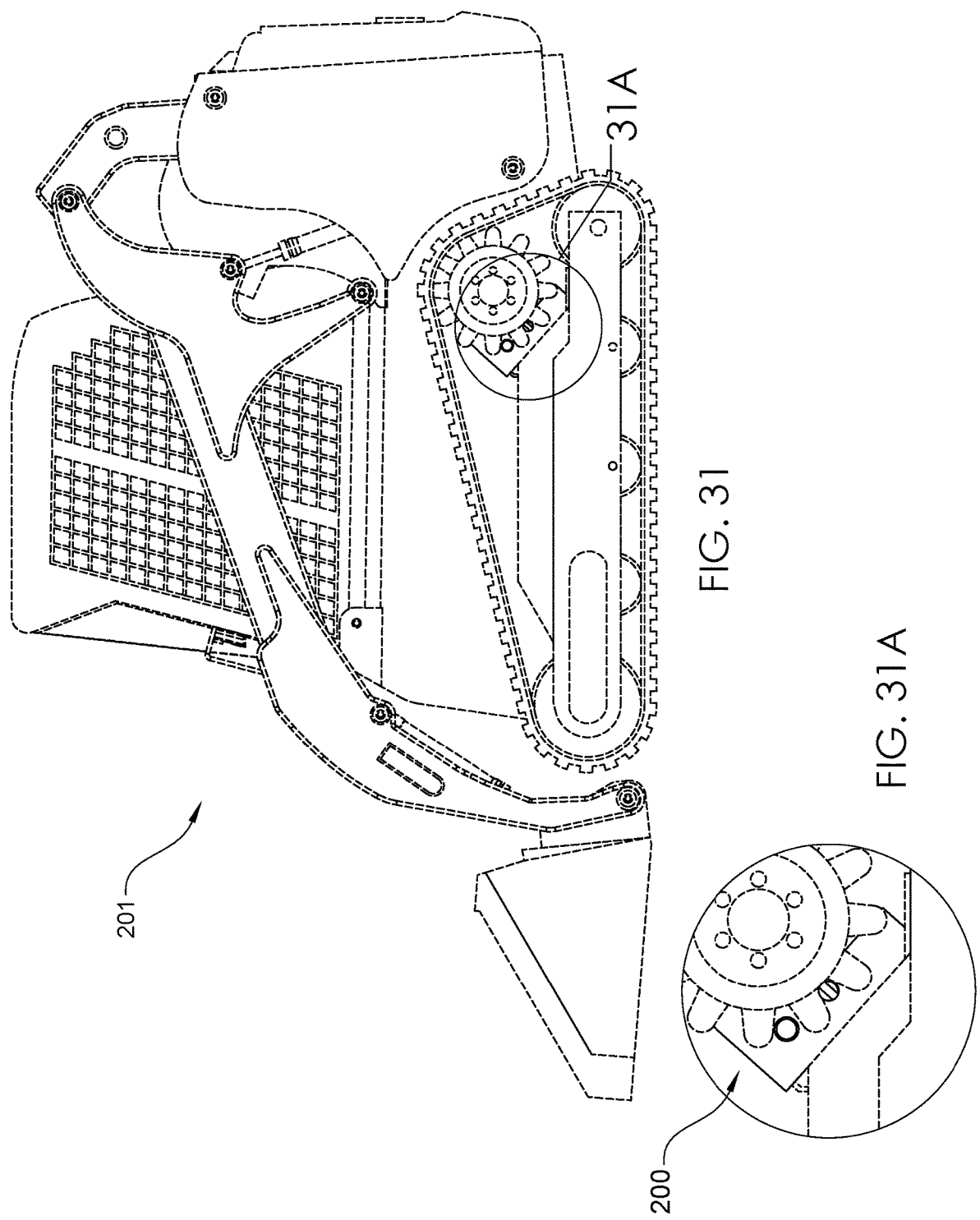
FIG. 31 is an environmental view showing the guarded track lock affixed to a track loader, during installation, wherein the face plate and protective cover are removed from the bolt.
Figure 36:
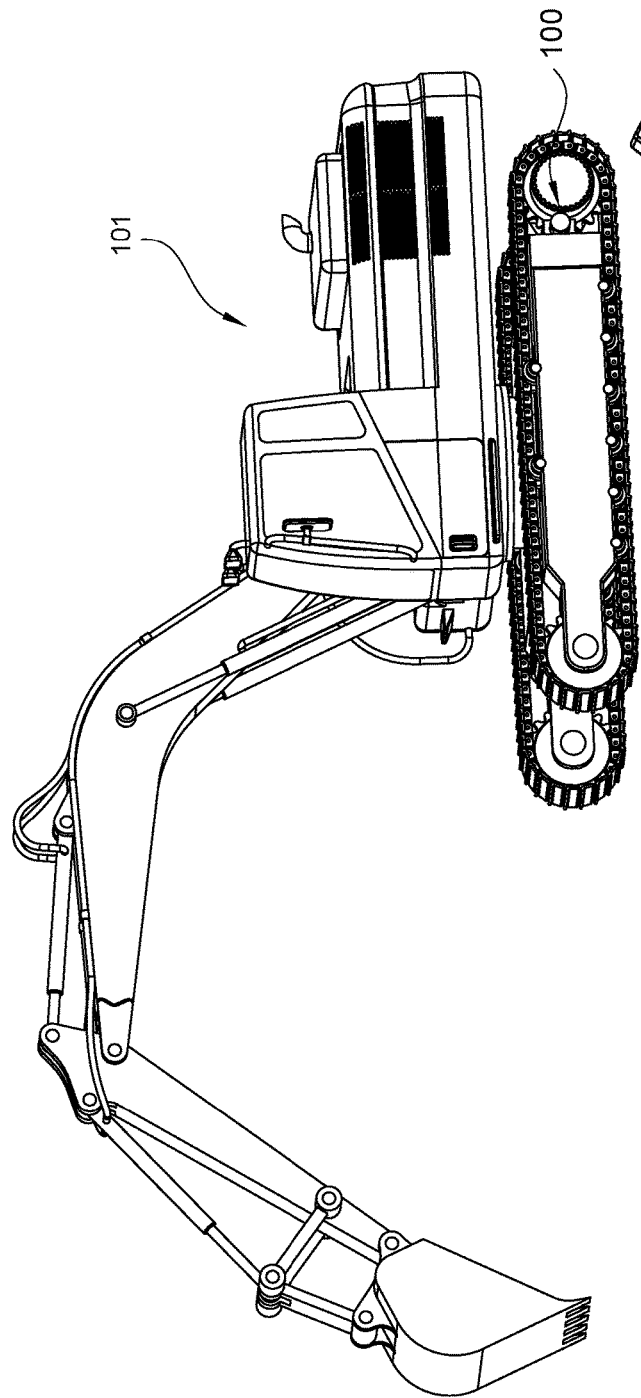
FIG. 36 is yet another environmental view showing the guarded track lock affixed to an excavator, after installation, wherein the face plate and protective cover are attached to the bolt.
Figure 37:
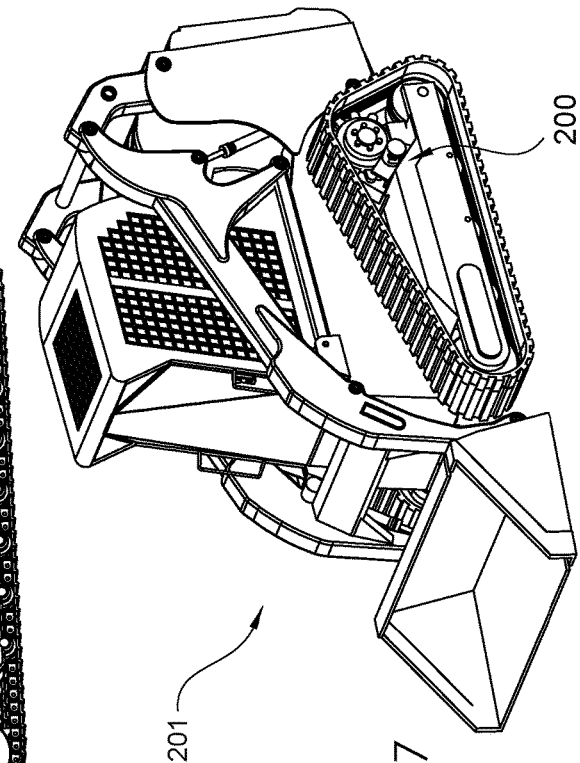
FIG. 37 is yet another environmental view showing the guarded track lock affixed to a track loader, after installation, wherein the face plate and protective cover are attached to the bolt.

The non-limiting exemplary embodiments are referred to generally in FIGS. 1-37 and are intended to provide specially designed guarded track locks 100, 200 for preventing unauthorized operation of power-operated machinery (e.g., excavator 101, track loader 201) having rotating tracks. It should be understood that the exemplary embodiment(s) may be used to lock a variety of power-operated machinery employing rotating tracks, and should not be limited to any particular machinery described herein.

The term "guarded" is intended to mean "tamper-proof" so that an unauthorized person cannot cut or otherwise break off the guarded track locks 100, 200 from the machinery (e.g., excavator 101, track loader 201).

Figure 18A:
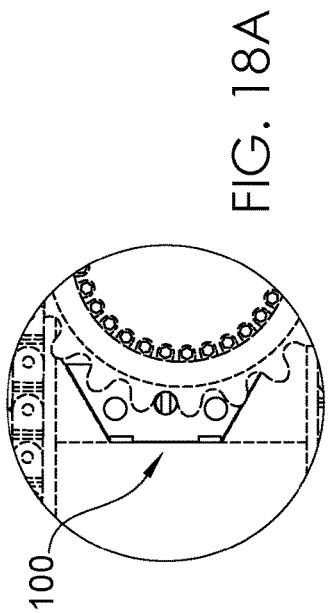
FIG. 18A is an enlarged view of section 18A taken in FIG. 18.

Referring to FIGS. 1-18a and 36, in a non-limiting exemplary embodiment, a guarded track lock 100 for preventing unauthorized operation of a power-operated machinery (e.g., excavator 101) having a track rotated by a sprocket, is illustrated. Such a guarded track lock 100 includes a support plate 102 having a planar anterior face 103, a plurality of fingers 124 protruding outwardly away from the planar anterior face 103, a plurality of support arms 105 protruding outwardly away from the planar anterior face 103 and registered parallel to the fingers 124, respectively, and a bolt 104 protruding outwardly away from the planar anterior face 103 and registered parallel to the fingers 124 and the support arms 105. The guarded track lock 100 further includes a face plate 105 has an aperture 106 and an arcuate rim 107 juxtaposed to the aperture 106, a protective cover 108 removably engaged with the face plate 105 and supported against the arcuate rim 107, a nut 109 threadably affixed to the bolt 104 and seated within the protective cover 108, and a key-actuated locking member 110 (e.g., puck lock) releasably connected to the bolt 104 and seated within the protective cover 108. Advantageously, the bolt 104 is configured to fit through the sprocket of the existing power-operated machinery (e.g., excavator 101), thereby providing the new and useful result of prohibiting operation of the track in forwarded and reward directions. Such a structural configuration provides the new, useful, and unexpected result of ensuring an unauthorized user cannot move the excavator 101.

In a non-limiting exemplary embodiment, the support plate 102 has a trapezoid shape, and the face plate 105 is intercalated between the support plate 102 and the protective cover 108.

In a non-limiting exemplary embodiment, the plurality of fingers 124 each have a longitudinal length registered orthogonal to the planar anterior face 103.

In a non-limiting exemplary embodiment, the plurality of support arms 105 are statically coupled to a longitudinal peripheral edge 112 of the support plate 102.

In a non-limiting exemplary embodiment, the bolt 104 includes a threaded distal end 113 having a flattened tip 114 provided with a hole 115 therethrough.

In a non-limiting exemplary embodiment, the face plate 105 is substantially L-shaped and has a planar wall 116 oriented parallel to the support arms 105.

In a non-limiting exemplary embodiment, the protective cover 108 has a generally cylindrical shape and includes an access opening 117 configured to receive the nut 109 and the locking member 110. Advantageously, the bolt 104 is removably inserted through the aperture 106 along a linear travel path 118 such that the flattened tip 114 terminates within the protective cover 108. Such a structural configuration provides the new, useful, and unexpected result of ensuring an unauthorized user cannot move the excavator 101.

In a non-limiting exemplary embodiment, the locking member 110 includes a key-actuated locking member 110 (puck lock) being detachable from the bolt 104.

In a non-limiting exemplary embodiment, the arcuate rim 107 has a radius of curvature 119 substantially equal to a radius of curvature 139 of the protective cover 108.

Referring to FIGS. 19-35A and 37, in a non-limiting exemplary embodiment, a guarded track lock 200 for preventing unauthorized operation of a power-operated machinery (e.g., track loader 201) having a track rotated by a sprocket, is disclosed. Such a guarded track lock 200 includes a support plate 202 having a planar anterior face 203, a finger 224 protruding outwardly away from the planar anterior face 203, and a bolt 204 protruding outwardly away from the planar anterior face 203 and registered parallel to the finger 224. The guarded track lock 200 further includes a face plate 205 having a plurality of statically coupled portions 225, 226 angularly offset from a central axis 227 of the bolt 204, wherein one of the portions 225 has a first aperture 206 and a second aperture 206a configured to receive the bolt 204 therethrough. The guarded track lock 200 further includes a protective cover 208 removably engaged with the face plate 205 and supported against the one portion 225, a nut 209 threadably affixed to the bolt 204 and seated within the protective cover 208, and a key-actuated locking member 210 (e.g., puck lock) releasably connected to the bolt 204 and seated within the protective cover 208. Advantageously, the bolt 204 is configured to fit through the sprocket of the existing power-operated machinery (e.g., track loader 201), thereby providing the new and useful result of prohibiting operation of the track in forwarded and reward directions. Such a structural configuration provides the new, useful, and unexpected result of ensuring an unauthorized user cannot move the track loader 201.

In a non-limiting exemplary embodiment, the support plate 202 further has a planar posterior face 228 coupled to the planar anterior face 203 and registered orthogonal thereto.

In a non-limiting exemplary embodiment, the finger 224 has a longitudinal length registered orthogonal to the planar anterior face 203.

In a non-limiting exemplary embodiment, the finger 224 is spaced apart from the bolt 204 and the planar posterior face 228.

In a non-limiting exemplary embodiment, the bolt 204 includes a threaded distal end 213 having a flattened tip 214 provided with a hole 215 therethrough.

In a non-limiting exemplary embodiment, the protective cover 208 has a generally cylindrical shape and includes an access opening 217 configured to receive the nut 209 and the locking member 210. Advantageously, the bolt 204 is removably inserted through one of the first aperture 206 and the second aperture 206a along a mutually exclusive linear travel path 218 or 218a such that the flattened tip 214 terminates within the protective cover 208. Such a structural configuration provides the new, useful, and unexpected result of ensuring an unauthorized user cannot move the track loader 201.

In a non-limiting exemplary embodiment, the locking member 210 includes a key-actuated locking member 210 (puck lock) being detachable from the bolt 204.

In a non-limiting exemplary embodiment, the one portion 225 has a planar side wall 229 detachable abutted against the planar anterior face 203 when the flattened tip 214 is situated inside the protective cover 208. In this manner, the finger 224 engages the one portion 225.

In a non-limiting exemplary embodiment, the face plate 205 is intercalated between the support plate 202 and the protective cover 208.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A guarded track lock for preventing unauthorized operation of a power-operated machinery having a track rotated by a sprocket, said guarded track lock comprising:
   a support plate including
      a planar anterior face,
      a plurality of fingers protruding outwardly away from said planar anterior face,
      a plurality of support arms protruding outwardly away from said planar anterior face and registered parallel to said fingers, respectively, and
      a bolt protruding outwardly away from said planar anterior face and registered parallel to said fingers and said support arms;
   a face plate having an aperture and an arcuate rim juxtaposed to said aperture;
   a protective cover removably engaged with said face plate and supported against said arcuate rim;
   a nut threadably affixed to said bolt and seated within said protective cover; and
   a key-actuated locking member releasably connected to said bolt and seated within said protective cover;
   wherein said bolt is configured to fit through the sprocket of the existing power-operated machinery and prohibit operation of the track in forwarded and reward directions.

2. The guarded track lock of claim 1, wherein said support plate has a trapezoid shape, wherein said face plate is intercalated between said support plate and said protective cover.

3. The guarded track lock of claim 1, wherein said plurality of fingers each have a longitudinal length registered orthogonal to said planar anterior face.

4. The guarded track lock of claim 1, wherein said plurality of support arms are statically coupled to a longitudinal peripheral edge of said support plate.

5. The guarded track lock of claim 1, wherein said bolt includes a threaded distal end having a flattened tip provided with a hole therethrough.

6. The guarded track lock of claim 1, wherein said face plate is substantially L-shaped and has a planar wall oriented parallel to said support arms.

7. The guarded track lock of claim 5, wherein said protective cover has a generally cylindrical shape and includes an access opening configured to receive said nut and said locking member;
   wherein said bolt is removably inserted through said aperture along a linear travel path such that said flattened tip terminates within said protective cover.

8. The guarded track lock of claim 1, wherein said locking member comprises: a key-actuated locking member being detachable from said bolt.

9. The guarded track lock of claim 1, wherein said arcuate rim has a radius of curvature substantially equal to a radius of curvature of said protective cover.

10. A guarded track lock for preventing unauthorized operation of a power-operated machinery having a track rotated by a sprocket, said guarded track lock comprising:
   a support plate including
      a planar anterior face,
      a finger protruding outwardly away from said planar anterior face, and
      a bolt protruding outwardly away from said planar anterior face and registered parallel to said finger;
   a face plate having a plurality of statically coupled portions angularly offset from a central axis of said bolt, one of said portions having a first aperture and a second aperture configured to receive said bolt therethrough;
   a protective cover removably engaged with said face plate and supported against said one portion;
   a nut threadably affixed to said bolt and seated within said protective cover; and
   a locking member releasably connected to said bolt and seated within said protective cover;
   wherein said bolt is configured to fit through the sprocket of the existing power-operated machinery, thereby prohibiting operation of the track in forwarded and reward directions.

11. The guarded track lock of claim 10, wherein said support plate further has a planar posterior face coupled to said planar anterior face and registered orthogonal thereto.

12. The guarded track lock of claim 10, wherein said finger has a longitudinal length registered orthogonal to said planar anterior face.

13. The guarded track lock of claim 10, wherein said finger is spaced apart from said bolt and said planar posterior face.

14. The guarded track lock of claim 10, wherein said bolt includes a threaded distal end having a flattened tip provided with a hole therethrough.

15. The guarded track lock of claim 14, wherein said protective cover has a generally cylindrical shape and includes an access opening configured to receive said nut and said locking member;
  wherein said bolt is removably inserted through one of said first aperture and said second aperture along a mutually exclusive linear travel path such that said flattened tip terminates within said protective cover.

16. The guarded track lock of claim 10, wherein said locking member comprises: a key-actuated locking member being detachable from said bolt.

17. The guarded track lock of claim 14, wherein said one portion has a planar side wall detachable abutted against said planar anterior face when said flattened tip is situated inside said protective cover, wherein said finger engages said one portion.

18. The guarded track lock of claim 10, wherein said face plate is intercalated between said support plate and said protective cover.

\* \* \* \* \*